(12) United States Patent
Chang

(10) Patent No.: US 7,215,101 B2
(45) Date of Patent: May 8, 2007

(54) SOFT-SWITCHING DC/DC CONVERTER HAVING RELATIVELY FEWER ELEMENTS

(75) Inventor: Yu-Ming Chang, Taoyuan Shien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 47 days.

(21) Appl. No.: 11/141,217

(22) Filed: May 31, 2005

(65) Prior Publication Data
US 2005/0265055 A1 Dec. 1, 2005

(30) Foreign Application Priority Data
May 31, 2004 (TW) .................. 93115581 A (51) Int. Cl.
*G05F 1/613* (2006.01)
(52) U.S. Cl. .................. 323/224; 323/222
(58) Field of Classification Search ........ 323/222, 323/282, 207, 254, 339, 344, 249, 224
See application file for complete search history.

(56) References Cited
U.S. PATENT DOCUMENTS
5,477,131 A * 12/1995 Gegner ................ 323/222

\* cited by examiner

*Primary Examiner*—Rajnikant B Patel
(74) *Attorney, Agent, or Firm*—Volpe and Koenig, P.C.

(57) ABSTRACT

The proposed soft-switching DC/DC converter includes: a basic non-isolated DC/DC converter having an inductor, and an auxiliary switch module including: an auxiliary switch having a first terminal electrically connected to a first terminal of the inductor, a second terminal, and a control terminal, a resonant inductor having a first terminal electrically connected to the second terminal of the auxiliary switch, a resonant diode having a cathode electrically connected to a second terminal of the resonant inductor and an anode electrically connected to a second terminal of the inductor, and a main switch. A driving signal is input to the control terminals of the main and the auxiliary switches from a driving circuit to switch the main and the auxiliary switches at a zero-voltage and a zero-current so as to have zero switching loss respectively.

12 Claims, 12 Drawing Sheets

SOFT-SWITCHING DC/DC CONVERTER HAVING RELATIVELY FEWER ELEMENTS

FIELD OF THE INVENTION

The present invention relates to a soft-switching DC/DC converter. More specifically, this invention relates to a soft-switching DC/DC converter having relatively fewer elements.

BACKGROUND OF THE INVENTION

Figure 1:
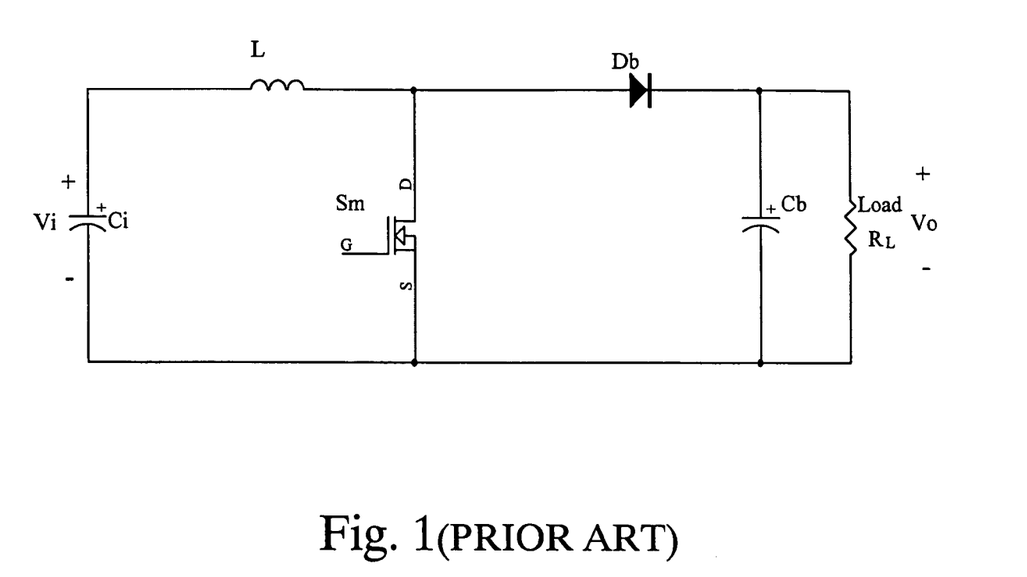
FIG. 1 is the schematic circuit diagram of a conventional non-isolated boost DC/DC converter in the prior art.

Please refer to FIG. 1, it shows the schematic circuit diagram of a conventional non-isolated boost DC/DC converter in the prior art. In which, the non-isolated boost DC/DC converter includes an input capacitor Ci, a main choke L, a switch Sm, a main diode Db, and an output capacitor Cb. The configuration of the boost DC/DC converter as shown in FIG. 1 is employed in the hard-switching module. If the switching frequency increases dramatically, the switching losses would also be increased dramatically, and the size of the heat-dissipating plate needs to be increased too. Besides, the EMI problem would become more serious due to the increased switching frequency, and the size of the EMI filter would be increased as well.

Figure 2:
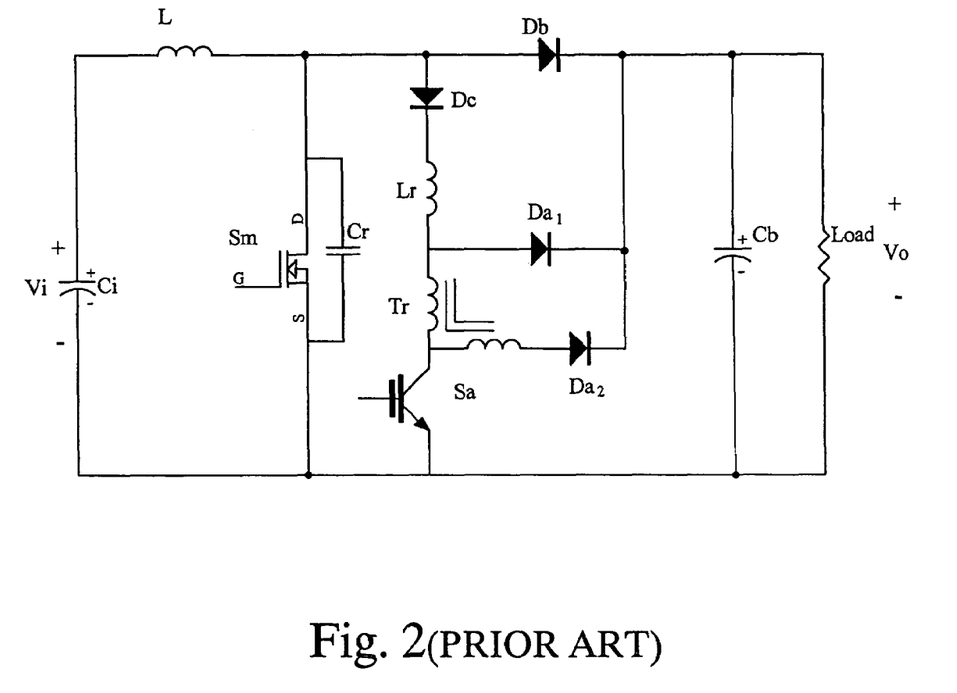
FIG. 2 is the schematic circuit diagram of another boost DC/DC converter in the prior art.

Please refer to FIG. 2, it shows the schematic circuit diagram of another boost DC/DC converter in the prior art, which is proposed to resolve the drawbacks of the above-mentioned conventional non-isolated boost DC/DC converter as shown in FIG. 1. In which, the boost DC/DC converter includes three diodes Dc, Da1, and Da2, a resonant inductor Lr, a transformer Tr, a resonant capacitor Cr, and a auxiliary switch Sa except for the original configuration of FIG. 1. Through the operations of these elements, the advantage of employing the soft-switching technique so as to have no switching losses can be achieved. This advantage of having no switching losses would make the increasing of the switching frequency become possible, and also has the effects of decreasing the EMI and the RFI. But, the configuration of the boost DC/DC converter as shown in FIG. 2 still has certain drawbacks such as the number of increased elements is relatively large, thus the size of the boost DC/DC converter can not be decreased in certain occasions. If the number of elements of the proposed boost DC/DC converter could be decreased further, it could be applied to an even broader range and would have an even better effect.

Keeping the drawbacks of the prior arts in mind, and employing experiments and research full-heartily and persistently, the applicant finally conceived the soft-switching DC/DC converter having relatively fewer elements. The proposed soft-switching DC/DC converter has the following advantages: decreasing the switching losses of the proposed converter, having relatively smaller sizes of the proposed converter (not only the main magnetic elements, but also the heat-dissipating plates, and all added elements for achieving the soft-switching are all downsized), decreasing the EMI of the proposed converter, increasing the efficiency of the proposed converter, and decreasing the total cost of the proposed converter relatively (for example, the sum of the manufacturing cost and the transportation cost is lower than that of the boost DC/DC converter of FIG. 2).

SUMMARY OF THE INVENTION

It is therefore an object of the present invention to propose a soft-switching DC/DC converter having relatively fewer elements for decreasing the switching losses of the converter, having relatively smaller sizes of the converter, decreasing the EMI of the converter, increasing the efficiency of the converter, and decreasing the total cost of the converter relatively.

According to the aspect of the present invention, the soft-switching DC/DC converter includes: a basic non-isolated DC/DC converter having an inductor, and an auxiliary switch module including: an auxiliary switch having a first terminal electrically connected to a first terminal of the inductor, a second terminal, and a control terminal, a resonant inductor having a first terminal electrically connected to the second terminal of the auxiliary switch, and a resonant diode having a cathode electrically connected to a second terminal of the resonant inductor and an anode electrically connected to a second terminal of the inductor, wherein a driving signal is input to the non-isolated DC/DC converter and the control terminal of the auxiliary switch from a driving circuit to switch the non-isolated DC/DC converter and the auxiliary switch at a zero-voltage and a zero-current so as to have zero switching loss respectively.

Preferably, the driving circuit includes a driving IC and a monostable circuit.

Preferably, the non-isolated DC/DC converter further includes a switch having a control terminal for receiving the driving signal, a first terminal, and a second terminal, and the switch and the auxiliary switch are ones of the combinations of a diode and a MOSFET electrically connected in series, the IGBTs having a high reverse bias, and the combinations of a diode and an IGBT electrically connected in series Preferably, the soft-switching DC/DC converter further includes a resonant capacitor electrically connected to the first and the second terminals of the switch in parallel, and the resonant capacitor is one of a built-in capacitor of the switch and an external capacitor.

Preferably, the non-isolated DC/DC converter is a boost DC/DC converter.

Preferably, the boost DC/DC converter further includes an input capacitor, a diode, and an output capacitor, the first terminal of the inductor is electrically connected to a first terminal of the input capacitor, the first terminal of the switch is electrically connected to a second terminal of the input capacitor, the second terminal of the switch is electrically connected to the second terminal of the inductor, an anode of the diode is electrically connected to the second terminal of the inductor, a cathode of the diode is electrically connected to a first terminal of the output capacitor, and a second terminal of the output capacitor is electrically connected to the second terminal of the input capacitor.

Preferably, the non-isolated DC/DC converter is a buck DC/DC converter.

Preferably, the buck DC/DC converter further includes an input capacitor, a diode, and an output capacitor, the second terminal of the switch is electrically connected to a first terminal of the input capacitor, the first terminal of the inductor is electrically connected to the first terminal of the switch, the second terminal of the inductor is electrically connected to a first terminal of the output capacitor, a cathode of the diode is electrically connected to the first terminal of the inductor, and an anode of the diode is electrically connected to the second terminals of the input and the output capacitors.

Preferably, the non-isolated DC/DC converter is a buck-boost DC/DC converter.

Preferably, the buck-boost DC/DC converter further includes an input capacitor, a diode, and an output capacitor, the second terminal of the switch is electrically connected to a first terminal of the input capacitor, the first terminal of the inductor is electrically connected to the first terminal of the switch, the second terminal of the inductor is electrically connected to a second terminal of the input capacitor, a cathode of the diode is electrically connected to the first terminal of the inductor, a first terminal of the output capacitor is electrically connected to the second terminal of the input capacitor, and an anode of the diode is electrically connected to a second terminal of the output capacitor.

The present invention may best be understood through the following descriptions with reference to the accompanying drawings, in which:

DETAILED DESCRIPTION OF THE PREFERRED EMBODIMENT

Figure 3:
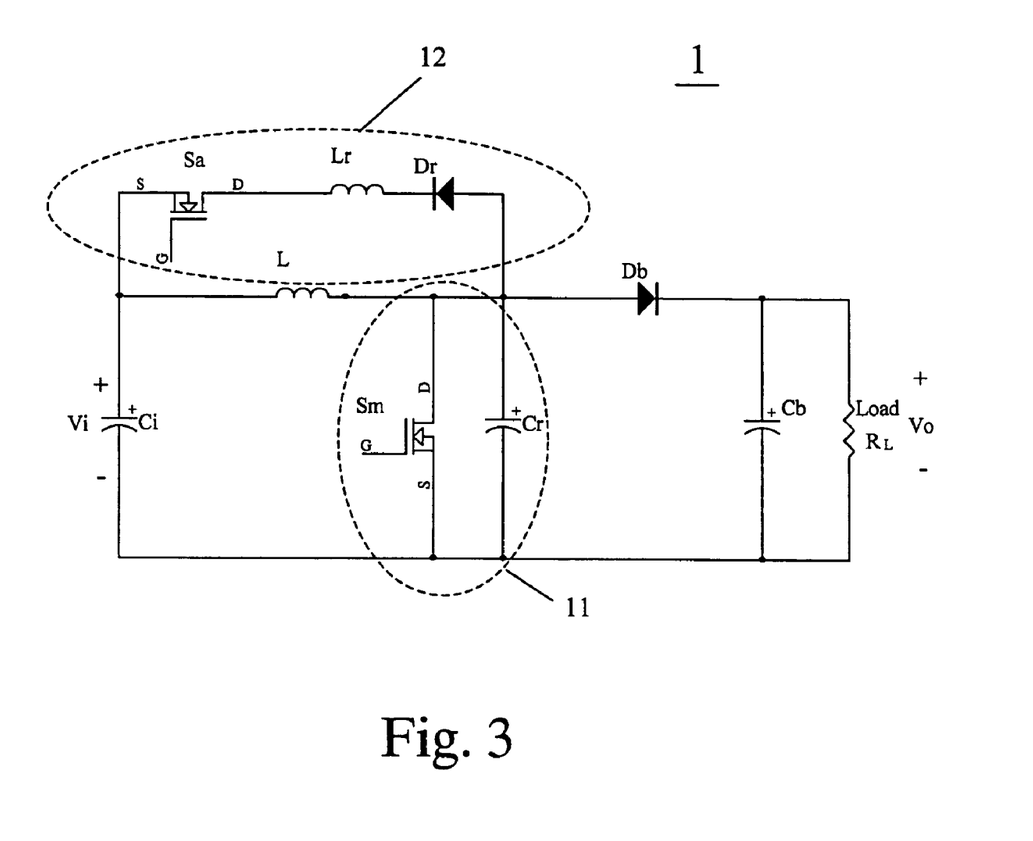
FIG. 3 is the schematic circuit diagram of the first preferred embodiment of the soft-switching boost DC/DC converter of the present invention.

Please refer to FIG. 3, it shows the schematic circuit diagram of the first preferred embodiment of the soft-switching boost DC/DC converter of the present invention. In which, the proposed soft-switching boost DC/DC converter 1 includes the basic components of the above-mentioned soft-switching DC/DC converter of the prior art as shown in FIG. 2: an input capacitor Ci, a main choke L, a main switch module 11 including: a main switch Sm (a MOSFET) having a first terminal (source), a second terminal (drain), and a control terminal (gate), and a resonant capacitor Cr having a first terminal electrically connected to the second terminal of the main switch Sm and having a second terminal electrically connected to the first terminal of the main switch Sm, an auxiliary switch module 12 including: an auxiliary switch Sa (a MOSFET) having a first terminal (source) electrically connected to the first terminal of the main choke L, a second terminal (drain), and a control terminal (gate), a resonant inductor Lr having a first terminal electrically connected to the second terminal of the auxiliary switch Sa, and a resonant diode Dr having a cathode electrically connected to the second terminal of the resonant inductor Lr and having an anode electrically connected to the second terminal of the main choke L, a main diode Db, and an output capacitor Cb. In which, the first terminal of the main choke L is electrically connected to the first terminal of the input capacitor Ci, the first terminal of the main switch Sm is electrically connected to the second terminal of the input capacitor Ci, the second terminal of the main switch Sm is electrically connected to the second terminal of the main choke L, an anode of the main diode Db is electrically connected to the second terminal of the main choke L, an cathode of the main diode Db is electrically connected to the first terminal of the output capacitor Cb, and the second terminal of the output capacitor Cb is electrically connected to the second terminal of the input capacitor Ci. Besides, a soft-switching method is applied to the proposed converter 1, and a driving signal (not shown) is sent from a driving circuit (could be a PWMIC, not shown) to the control terminals of the main switch Sm and the auxiliary switch Sa respectively to switch the main switch Sm and the auxiliary switch Sa at the zero-voltage and at the zero-current so as to let the proposed converter 1 have zero switching loss respectively.

The main switch Sm and the auxiliary switch Sa are ones of the combinations of a diode and a MOSFET electrically connected in series, the IGBTs having a high reverse bias, and the combinations of a diode and an IGBT electrically connected in series. The resonant capacitor Cr could be a stray capacitor of the main switch Sm, which is a built-in capacitor, or an external capacitor. The driving circuit includes a driving IC and a monostable circuit. Through the operations of the above-mentioned elements of the first preferred embodiment, the aforementioned advantages, which are decreasing the switching losses of the proposed converter, having relatively smaller sizes of the proposed converter, decreasing the EMI of the proposed converter, increasing the efficiency of the proposed converter, and decreasing the total cost of the proposed converter relatively, could be achieved.

The main difference between the first preferred embodiment of the proposed soft-switching boost DC/DC converter 1 of the present invention as shown in FIG. 3 and the conventional non-isolated boost DC/DC converter of the prior art as shown in FIG. 1 is that a unilateral switch Sa, a resonant inductor Lr, and a resonant capacitor Cr are added.

Before the operational principles of the first preferred embodiment of the proposed soft-switching boost DC/DC converter 1 of the present invention as shown in FIG. 3 are discussed, there are three assumptions described as follows:

1. Each switch (Sm and Sa) and each diode (Db and Dr) are under the ideal conditions;
2. The inductance of the main choke L is quite high, and the current flows through the main choke L within a cycle $i_L$ could be considered as a constant;
3. The input voltage Vi<(½) output voltage Vo, thus the requirement that the main switch Sm should be switched under zero voltage could be achieved.

As for the third assumption mentioned above, if it is under the ideal status, then Vi=(½)Vo and the voltage across the resonant capacitor Vcr could be released to zero. But the ideal status could not be achieved due to that there is the line impedance existed, thus only Vi<(½)Vo could be achieved.

According to the configuration of the first preferred embodiment of the proposed soft-switching boost DC/DC converter 1 of the present invention as shown in FIG. 3, the operational principles of the proposed circuits of the present invention are divided into 6 operational modes (Mode 1 to Mode 6 respectively, and back to Mode 1 after Mode 6 for a new cycle) according to the switching principles and sequence of the switches, and the operational principles are explained according to FIGS. 4 to 10.

Figure 4:
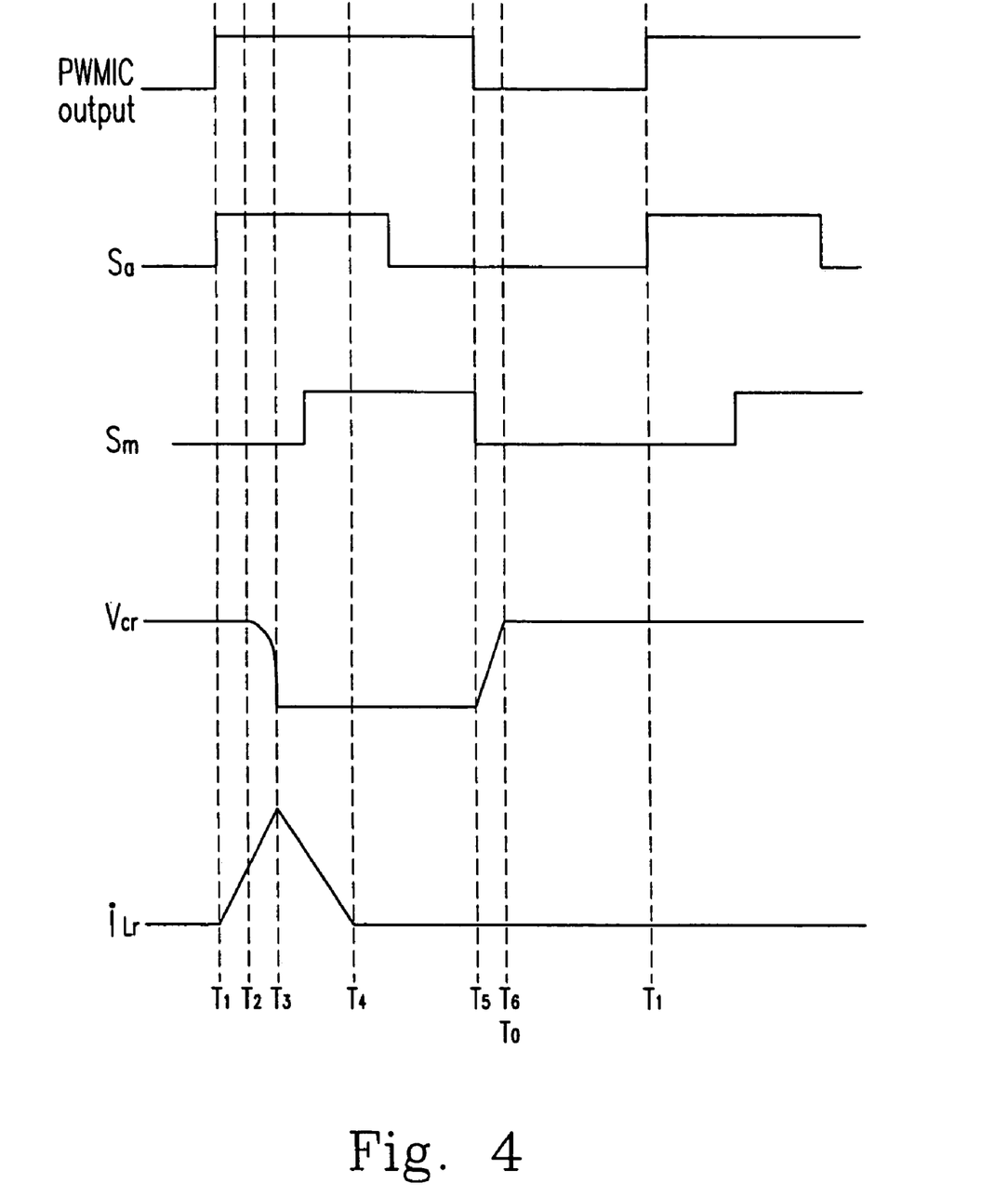
FIG. 4 shows the waveforms of the output signal of the PWMIC, the driving signals of the auxiliary switch and the main switch of the boost DC/DC converter, the voltage across the resonant capacitor, and the current on the resonant inductor of the first preferred embodiment of the present invention respectively.

Please refer to FIG. 4, it shows the waveforms of the output signal of the PWMIC (PWMIC output), the driving signals of the auxiliary switch (Sa) and the main switch (Sm) of the boost DC/DC converter, the voltage across the resonant capacitor (Vcr), and the current on the resonant inductor ($i_{hd\ Lr}$) of the first preferred embodiment of the present invention respectively. In FIG. 4, the time interval between T1 and T2 is Mode 1, the time interval between. T2 and T3 is Mode 2, the time interval between T3 and T4 is Mode 3, the time interval between T4 and T5 is Mode 4, the time interval between T5 and T6 is Mode 5, the time interval between T6 (namely T0) and T1 is Mode 6, and the time interval between T1 and T2 is back to Mode 1 again and a new cycle begins, which are divided according to the time intervals on the horizontal axis.

Figure 5:
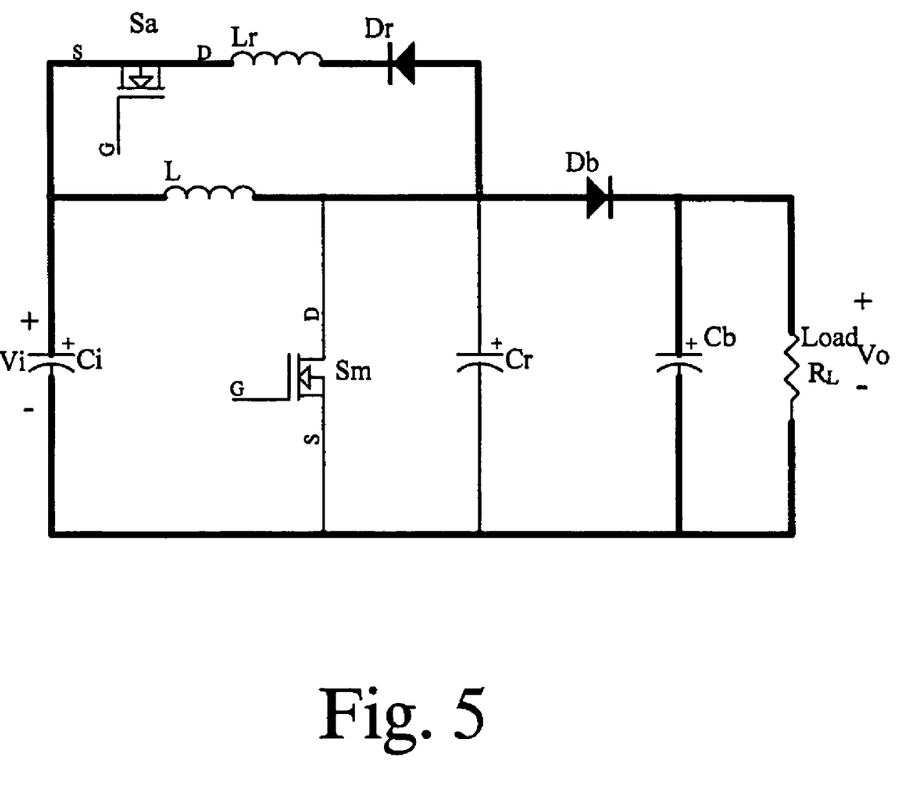
FIGS. 5 to 10 are the equivalent circuit diagrams showing the operational modes of the first preferred embodiment of the soft-switching boost DC/DC converter of the present invention respectively.

Please refer to FIG. 5, which is the equivalent circuit diagram showing the operational principles of Mode 1. Mode 1 begins when the auxiliary switch Sa is turned on. The auxiliary switch Sa is under a zero current status when the auxiliary switch Sa is turned on due to that the auxiliary switch Sa is electrically connected to the resonant inductor Lr in series. During the time period of Mode 1, the current flows through the resonant inductor Lr, $i_{Lr}$, is increased linearly, and can be represented by the following equation:

$$i_{Lr} = \frac{(V_0 - V_i)}{Lr}t.$$

In the above-mentioned equation, Vo is the output voltage, Vi is the input voltage, Lr is the resonant inductance, and t is the time.

Figure 6:
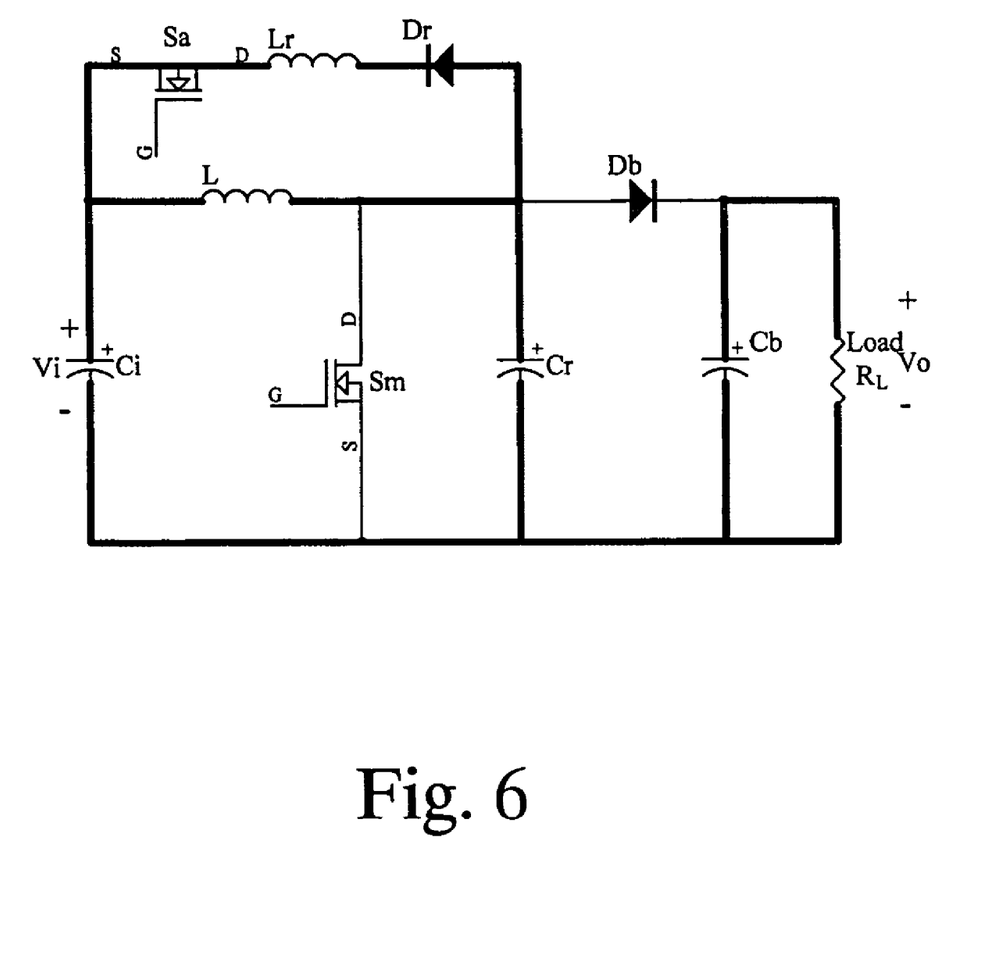

Please refer to FIG. 6, which is the equivalent circuit diagram showing the operational principles of Mode 2. Mode 2 begins when the current on the resonant inductor equals the current on the main choke, namely $i_{Lr}=i_L$, and the main diode Db is turned off smoothly under the zero current status. When the main diode Db is turned off smoothly, a resonance is caused by the voltage across the resonant capacitor Cr, Vcr (initial value V0), through the resonant inductor Lr. Mode 2 is ended when the voltage across the resonant capacitor Cr drops to zero through the resonance.

Figure 7:
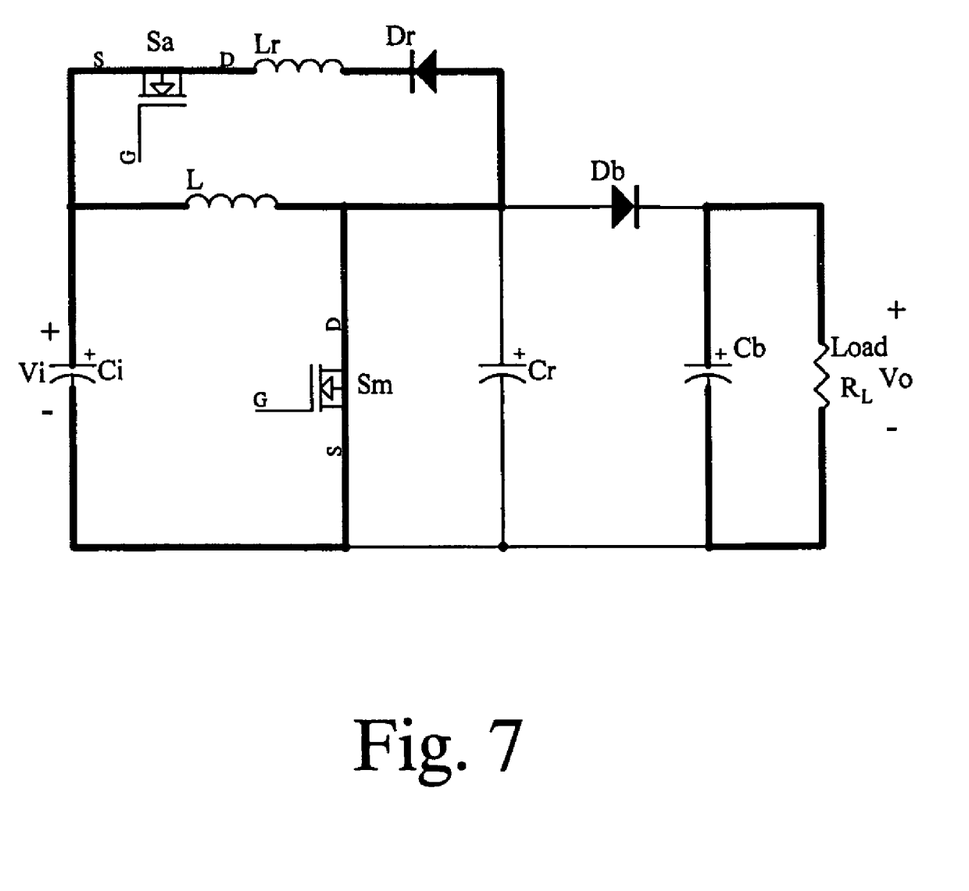

Please refer to FIG. 7, which is the equivalent circuit diagram showing the operational principles of Mode 3. Mode 3 begins when the body diode of the main switch Sm (a MOSFET) is turned on, and a current is sent back to the input terminal linearly and is caused by the energy stored in the resonant inductor Lr. When the main switch Sm is turned on during the time period of Mode 3, the advantages of that the main switch Sm is switched under the zero voltage status and has no switching loss could be achieved. In Mode 3, the current flows through the resonant inductor Lr could be represented by the following equation:

$$i_{Lr} = \frac{Vi}{Lr}t.$$

In which, Vi is the input voltage, Lr is the resonant inductance, and t is the time.

Figure 8:
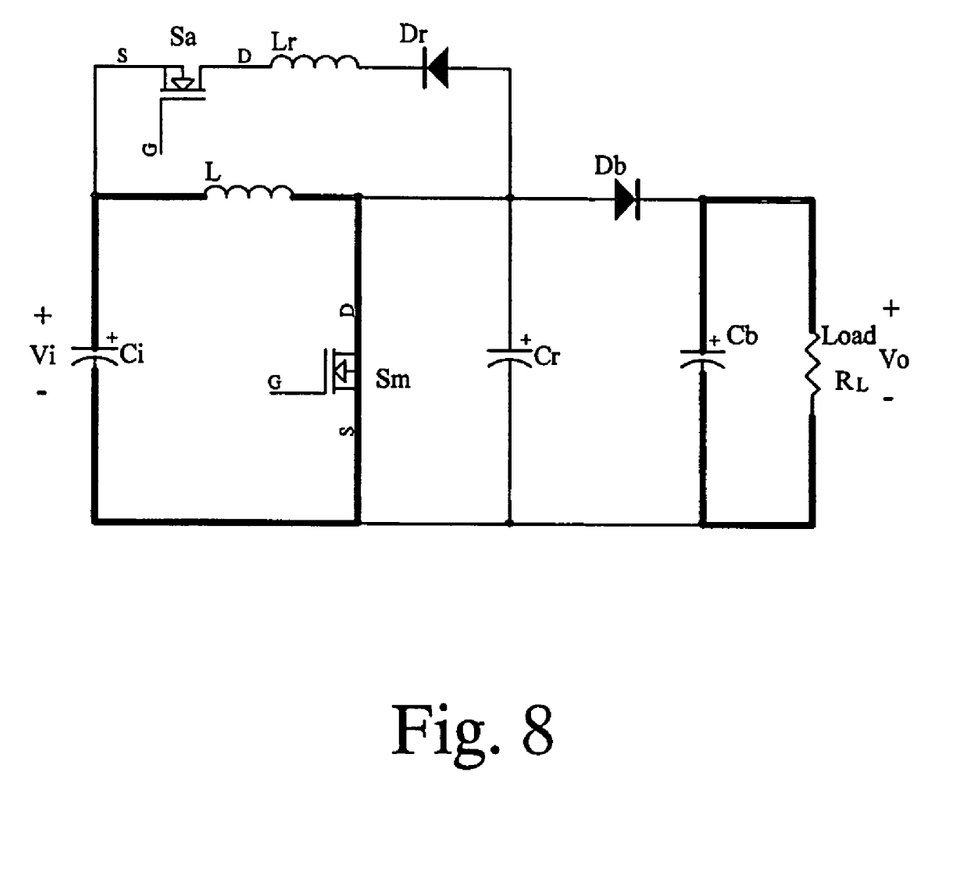

Please refer to FIG. 8, which is the equivalent circuit diagram showing the operational principles of Mode 4. Mode 4 begins when the energy of the resonant inductor Lr is released to zero. During the time period of Mode 4, the main choke L is under the charging status. In this stage, the proposed soft-switching boost DC/DC converter and the conventional hard-switching PWM boost converter are both under the charging status, and the operational principles are the same.

When the current flows through the resonant inductor Lr is decreased to zero, the resonant inductor Lr is blocked by the diode Dr since the diode Dr is under the reverse bias, and Mode 4 is ended at this moment in time.

Figure 9:
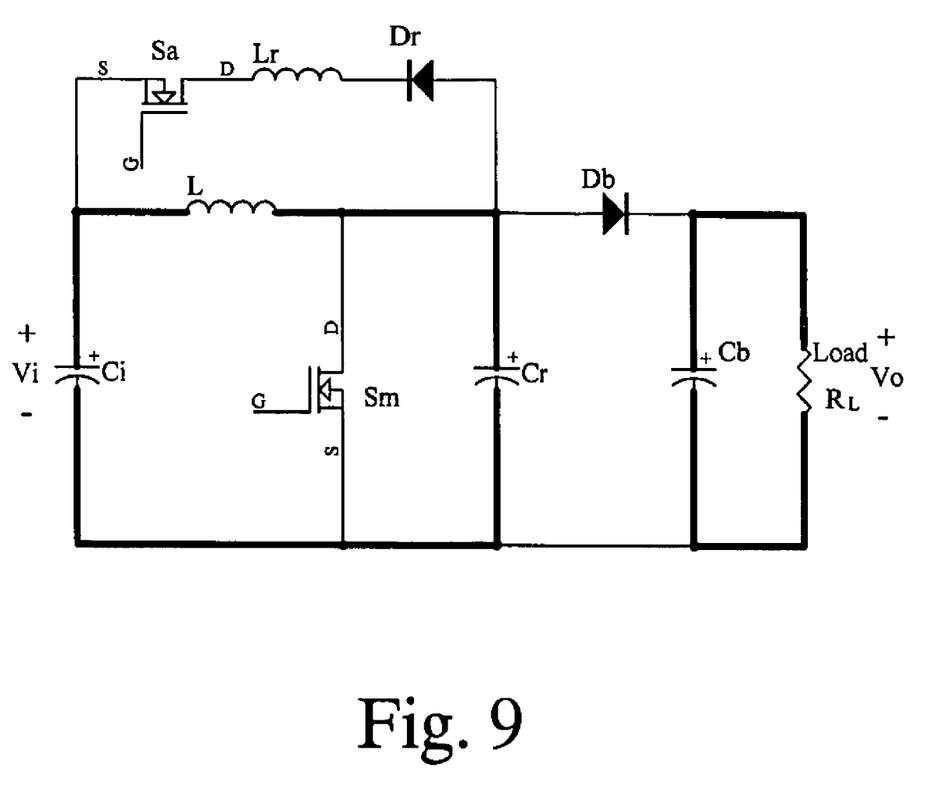

Please refer to FIG. 9, which is the equivalent circuit diagram showing the operational principles of Mode 5. Mode 5 begins when the main switch Sm is turned off. During this period, the current flows through the main choke L, $i_L$, will charge the resonant capacitor Cr linearly. The voltage across the resonant capacitor Cr, Vcr, could be represented by the following equation:

$$Vcr = \frac{i_L}{Cr}t.$$

In which, $i_L$ is the current flows through the main choke L, Cr is the resonant capacitance, and t is the time.

Figure 10:
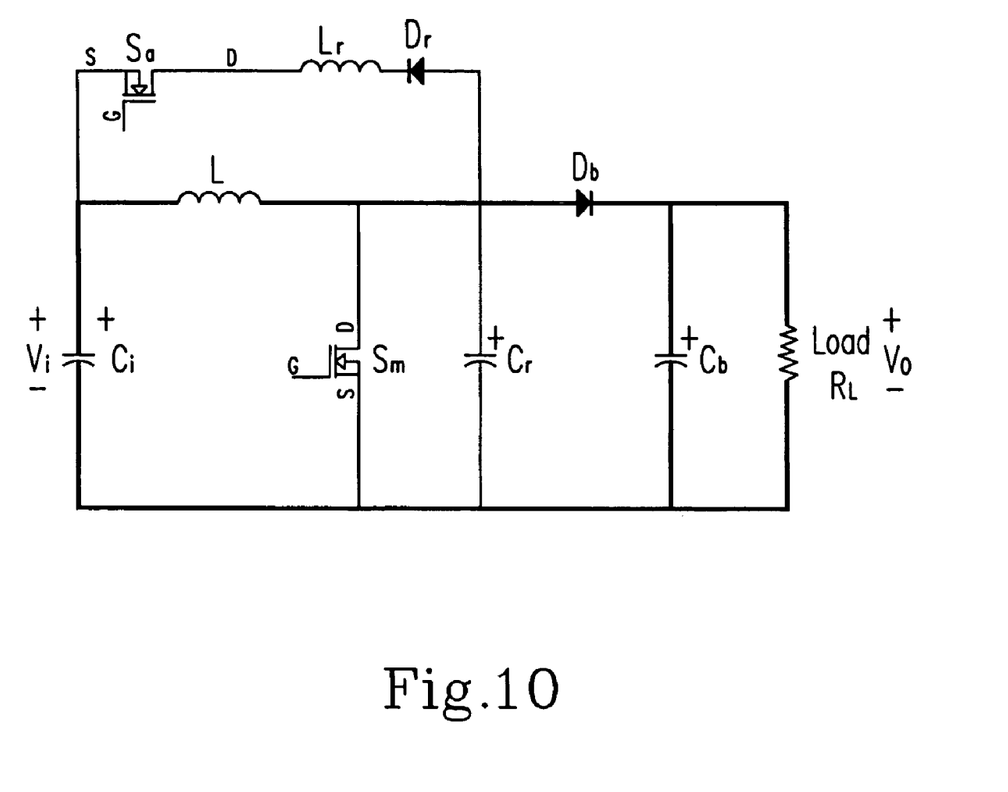

Please refer to FIG. 10, which is the equivalent circuit diagram showing the operational principles of Mode 6. In Mode 6, the current on the main choke L, $i_L$, flows to the output capacitor Cb, and the energy stored in the main choke L and the input energy are directed to and released to the output capacitor Cb and the load $R_L$. In this stage, the proposed soft-switching boost DC/DC converter and the conventional hard-switching PWM boost converter are both under the discharging status, and the operational principles are the same.

After Mode 6, it is Mode 1 again, and a new cycle begins.

Figure 11:
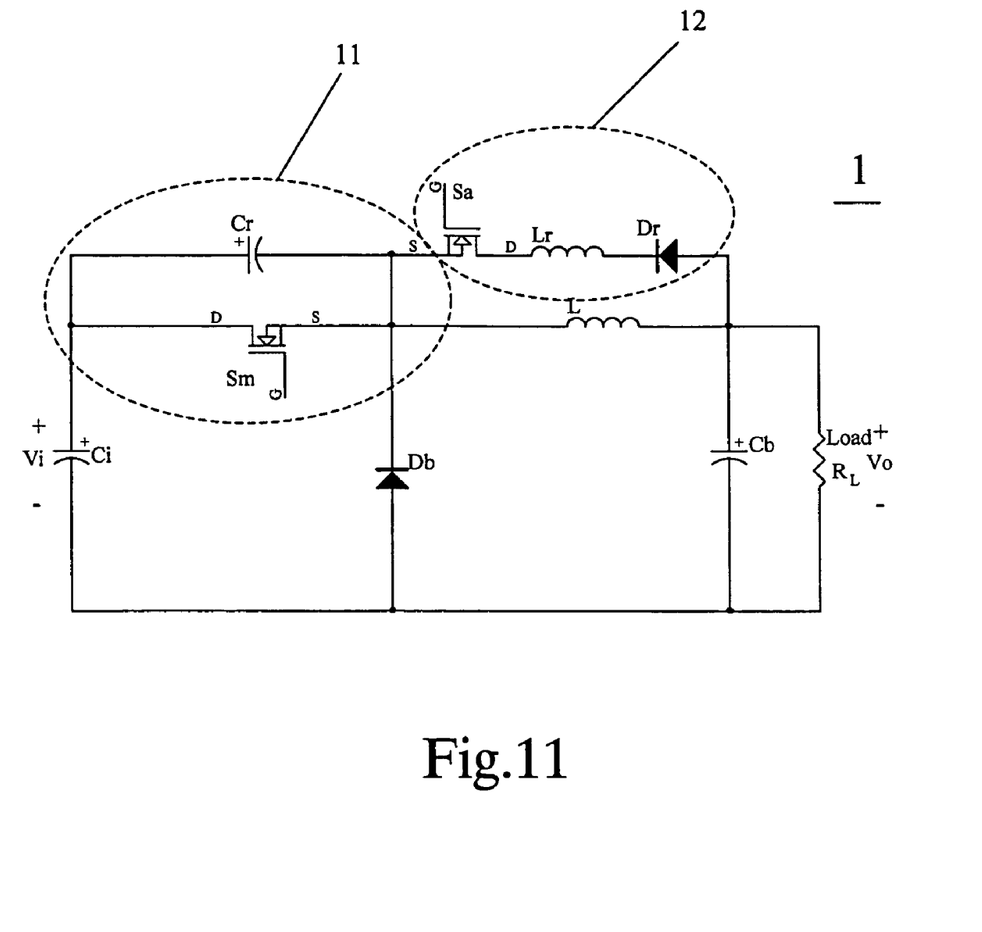
FIG. 11 is the schematic circuit diagram of the second preferred embodiment of the soft-switching buck DC/DC converter of the present invention.

The proposed soft-switching DC/DC converter of the present invention could be applied to the buck DC/DC converters except for applied to the boost DC/DC converters. Please refer to FIG. 11, which shows the schematic circuit diagram of the second preferred embodiment of the soft-switching buck DC/DC converter 1 of the present invention. The proposed soft-switching buck DC/DC converter 1 of the present invention also includes the basic components of the above-mentioned soft-switching DC/DC converter of the prior art as shown in FIG. 2, but the connecting between these basic components such as the main switch module 11 and the auxiliary switch 12 are different from those of the first preferred embodiment of the soft-switching boost DC/DC converter 1 of the present invention as shown in FIG. 3. In FIG. 11, the drain of the main switch Sm (a MOSFET) is electrically connected to the first terminal of the input capacitor Ci, the first terminal of the main choke L is electrically connected to the source of the main switch Sm, the second terminal of the main choke L is electrically connected to the first terminal of the output capacitor Cb, the cathode of the main diode Db is electrically connected to the first terminal of the main choke L, and the anode of the main diode Db is electrically connected to the second terminal of the input capacitor Ci and the second terminal of the output capacitor Cb. Due to that the configuration of the second preferred embodiment of the present invention is a soft-switching buck DC/DC converter, the third assumption regarding the first preferred embodiment of the present invention mentioned above should be changed to (½)Vi<Vo.

Figure 12:
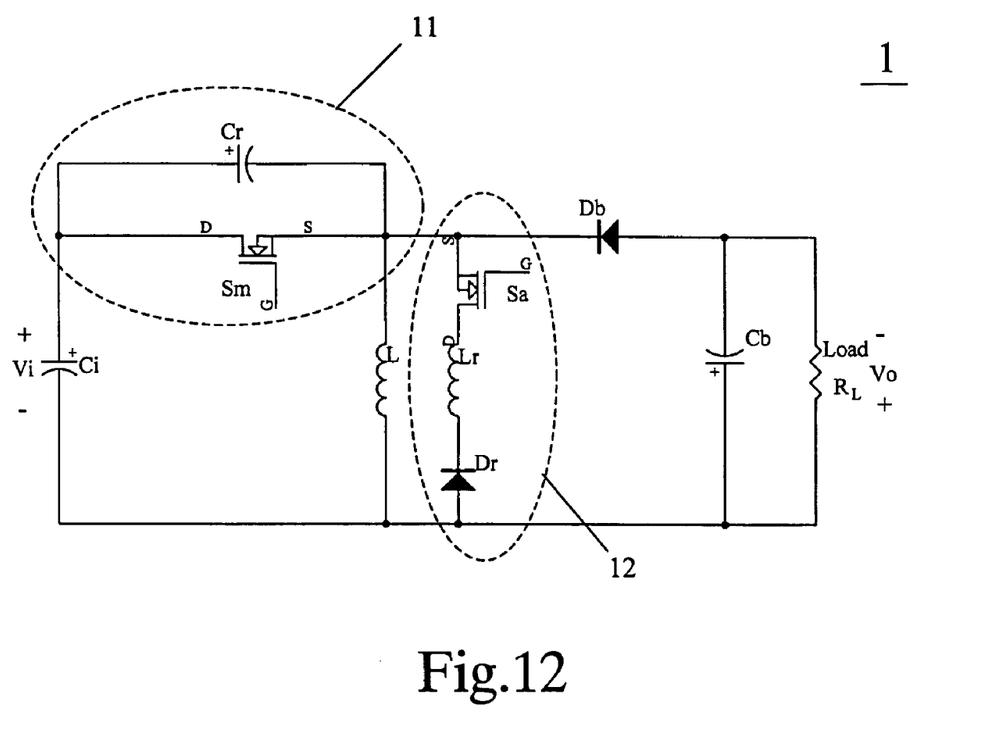
FIG. 12 is the schematic circuit diagram of the third preferred embodiment of the soft-switching buck-boost DC/DC converter of the present invention.

The proposed soft-switching DC/DC converter of the present invention could also be applied to the buck-boost DC/DC converters except for applied to the aforementioned boost and buck DC/DC converters. Please refer to FIG. 12, which shows the schematic circuit diagram of the third preferred embodiment of the soft-switching buck-boost DC/DC converter 1 of the present invention. The proposed soft-switching buck-boost DC/DC converter 1 of the present invention also includes the basic components of the above-mentioned soft-switching DC/DC converter of the prior art as shown in FIG. 2, but the connecting between these basic components such as the main switch module 11 and the auxiliary switch 12 are different from those of the first preferred embodiment of the soft-switching boost DC/DC converter 1 of the present invention as shown in FIG. 3 and the second preferred embodiment of the soft-switching buck DC/DC converter 1 of the present invention as shown in FIG. 11. In FIG. 12, the drain of the main switch Sm (a MOSFET) is electrically connected to the first terminal of the input capacitor Ci, the first terminal of the main choke L is electrically connected to the source of the main switch Sm, the second terminal of the main choke L is electrically connected to the second terminal of the input capacitor Ci, the cathode of the main diode Db is electrically connected to the first terminal of the main choke L, the anode of the main diode Db is electrically connected to the second terminal of the output capacitor Cb, and the first terminal of the output capacitor Cb is electrically connected to the second terminal of the input capacitor Ci. Due to that the configuration of the third preferred embodiment of the present invention is a soft-switching buck-boost DC/DC converter, the third assumption regarding the first preferred embodiment of the present invention mentioned above should be changed to Vi<Vo.

According to the above descriptions, the proposed soft-switching DC/DC converter has the special features described as follows. A driving signal is sent from a driving circuit to control the main switch Sm and the auxiliary switch Sa respectively for soft-switching at the zero-voltage and at the zero-current so as to let the proposed converter 1 have zero switching loss respectively, and the magnetic elements having relatively smaller sizes could be employed due to the relatively lower switching losses. Thus, a soft-switching DC/DC converter having relatively fewer elements is proposed in the present invention and has the following advantages: decreasing the switching losses of the proposed converter, having relatively smaller sizes of the proposed converter, decreasing the EMI of the proposed converter, increasing the efficiency of the proposed converter, and decreasing the total cost of the proposed converter relatively.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A soft-switching DC/DC converter, comprising:
    a basic non-isolated DC/DC converter, comprising:
        a main switch having a first terminal, a second terminal and a control terminal; and
        an inductor having a first terminal electrically connected to said first terminal of said main switch and a second terminal; and
    an auxiliary switch module, comprising:
        an auxiliary switch having a first terminal electrically connected to said first terminal of said inductor, a second terminal, and a control terminal;
        a resonant inductor having a first terminal electrically connected to said second terminal of said auxiliary switch; and
        a resonant diode having a cathode electrically connected to a second terminal of said resonant inductor and an anode electrically connected to said second terminal of said inductor;
    wherein a driving signal is input to said control terminal of said main switch and said control terminal of said auxiliary switch from a driving circuit to switch said main switch and said auxiliary switch at a zero-voltage and a zero-current so as to have zero switching loss respectively.

2. The converter according to claim 1, wherein said driving circuit comprises a driving IC and a monostable circuit.

3. The converter according to claim 1, wherein said main switch and said auxiliary switch are ones of combinations of a diode and a MOSFET electrically connected in series, IGBTs having a high reverse bias, and combinations of a diode and an IGBT electrically connected in series.

4. The converter according to claim 3, wherein said soft-switching DC/DC converter further comprises a resonant capacitor electrically connected to said first and said second terminals of said main switch in parallel, and said resonant capacitor is one of a built-in capacitor of said main switch and an external capacitor.

5. The converter according to claim 4, wherein said non-isolated DC/DC converter is a buck DC/DC converter.

6. The converter according to claim 5, wherein said buck DC/DC converter further comprises an input capacitor, a diode, and an output capacitor, said second terminal of said main switch is electrically connected to a first terminal of said input capacitor, said second terminal of said inductor is electrically connected to a first terminal of said output capacitor, a cathode of said diode is electrically connected to said first terminal of said inductor, and an anode of said diode is electrically connected to said second terminals of said input and said output capacitors.

7. The converter according to claim 4, wherein said non-isolated DC/DC converter is a buck-boost DC/DC converter.

8. The converter according to claim 7, wherein said buck-boost DC/DC converter further comprises an input capacitor, a diode, and an output capacitor, said second terminal of said main switch is electrically connected to a first terminal of said input capacitor, said second terminal of said inductor is electrically connected to a second terminal of said input capacitor, a cathode of said diode is electrically connected to said first terminal of said inductor, a first terminal of said output capacitor is electrically connected to said second terminal of said input capacitor, and an anode of said diode is electrically connected to a second terminal of said output capacitor.

9. A soft-switching DC/DC converter, comprising:
    a basic non-isolated DC/DC converter, comprising:
        an input capacitor having a first terminal and a second terminal;
        a main switch having a first terminal, a second terminal electrically connected to said first terminal of said input capacitor and a control terminal;

an inductor having a first terminal electrically connected to said first terminal of said main switch and a second terminal;

a diode having a cathode electrically connected to said first terminal of said inductor and an anode; and an output capacitor having a first terminal electrically connected to said second terminal of said inductor and a second terminal electrically connected to said anode of said diode; and an auxiliary switch module, comprising:

an auxiliary switch having a first terminal electrically connected to said first terminal of said inductor, a second terminal, and a control terminal;

a resonant inductor having a first terminal electrically connected to said second terminal of said auxiliary switch and a second terminal; and a resonant diode having a cathode electrically connected to said second terminal of said resonant inductor and an anode electrically connected to said second terminal of said inductor;

wherein a driving signal is input to said control terminal of said main switch and said control terminal of said auxiliary switch from a driving circuit to switch said main switch and said auxiliary switch at a zero-voltage and a zero-current so as to have zero switching loss respectively.

10. The converter according to claim 9, wherein said basic non-isolated DC/DC converter further comprises a resonant capacitor having a first terminal electrically connected to said second terminal of said main switch and a second terminal electrically connected to said first terminal of said main switch.

11. The converter according to claim 10, wherein said non-isolated DC/DC converter is a buck DC/DC converter, and said anode of said diode is electrically connected to said second terminal of said input capacitor.

12. The converter according to claim 10, wherein said non-isolated DC/DC converter is a buck-boost DC/DC converter, and said second terminal of said inductor is electrically connected to said second terminal of said input capacitor.

* * * * *